(12) United States Patent
Ogawa et al.

(10) Patent No.: US 6,589,412 B1
(45) Date of Patent: Jul. 8, 2003

(54) METHOD FOR PRODUCING A SLIDING MEMBER HAVING EXCELLENT SEIZURE RESISTANCE

(75) Inventors: Osamu Ogawa, Hamakita (JP); Motoyoshi Yamauchi, Hamamatsu (JP); Toshiki Kasamatsu, Hamamatsu (JP)

(73) Assignee: Dowa Mining Co., Ltd., Tokyo (JP)

( * ) Notice: Subject to any disclaimer, the term of this patent is extended or adjusted under 35 U.S.C. 154(b) by 185 days.

(21) Appl. No.: 09/684,665

(22) Filed: Oct. 10, 2000

(30) Foreign Application Priority Data

Oct. 20, 1999 (JP) ............................. 11-298635

(51) Int. Cl.⁷ .................................................. C25D 5/00
(52) U.S. Cl. ..................... 205/112; 205/113; 205/316; 205/320; 205/331
(58) Field of Search ................................ 205/112, 113, 205/316, 320, 331; 204/471, 489, 492

(56) References Cited

U.S. PATENT DOCUMENTS 3,770,595 A * 11/1973 Cros et al. .................. 205/206
6,139,973 A * 10/2000 Kawasaki et al. .......... 428/469
6,342,147 B1 * 1/2002 Lowrie ....................... 205/270

FOREIGN PATENT DOCUMENTS

| JP | 44-1809 | 1/1944 |
| JP | 63-12158 | 3/1988 |
| JP | 6-220689 | 8/1994 |

* cited by examiner

Primary Examiner—Roy King
Assistant Examiner—Wesley A. Nicolas
(74) Attorney, Agent, or Firm—McDermott, Will & Emery

(57) ABSTRACT

A sliding member having excellent seizure resistance comprising a metallic member provided with a sulfide-based solid lubricating layer on the sliding surface thereof is provided, characterized in that the interface of the metallic member in contact with said solid lubricating layer is provided with a surface roughness Rmax of 1 $\mu$m or higher. The sliding member above is obtained by preparing an aqueous solution dissolved therein one or two types or more of thiocyanates or thiosulfates of alkali metals or alkaline earth metals, and by performing electrolytic treatment in which a steel member the surface roughness thereof is controlled is used as the anode. In this manner, an iron sulfide based layer is formed on the surface of the steel member by using the Fe component derived from the steel and the S component from the solution as the reacting agents.

6 Claims, 2 Drawing Sheets

METHOD FOR PRODUCING A SLIDING MEMBER HAVING EXCELLENT SEIZURE RESISTANCE

BACKGROUND OF THE INVENTION

1. Field of the Invention

The present invention relates to a surface treatment for improving the seizure resistance of a mechanical element or component having a sliding surface (referred to hereinafter as a "sliding member") such as gears, bearings, etc., and in further detail, it relates to a sliding member having excellent seizure resistance having a sulfide-based solid lubricant layer on the sliding surface of a metallic member.

2. Description of the Related Art

Mechanical components such as various types of gears, bearings, pins or pivots, pistons or cylinders, etc., which move in contact with the surface of the metallic counter member, suffer problems of abnormal wear and seizure even in the presence of a lubricant oil. As a means of reducing such problems, it is known to form a solid lubricant layer based on sulfides such as an iron sulfide, a molybdenum sulfide, or a tungsten sulfide, etc., on the surface of the sliding member (particularly, a steel member).

As a means for forming a sulfide-based solid lubricant layer on the surface of a metallic member, generally known method is employing an electrochemical process. A representative method comprises performing electrolysis in an alkaline electrolytic solution by using the metallic member as the anode, thereby depositing a sulfide on the surface of the metallic member used as the anode. In addition to the anodic sulfurization treatment above, there is also known a special method comprising performing a treatment in a fused salt bath by using the metallic member as the cathode.

For instance, if an iron-based article is subjected to electrolytic treatment in a fused salt of potassium thiocyanate and sodium thiocyanate, the Fe component originating from the iron-based component and the S component from the bath react to form a sulfurized layer (an FeS based component) on the surface of the component. The sulfurization treatment technology is disclosed in Japanese Patent Publication JP-B 1809/1969, Japanese Patent Publication JP-B 12158/1988, and Japanese Patent JP-A 220689/1994. The patent publications above teach using a fused salt bath containing potassium thiocyanate and sodium thiocyanate mixed at a ratio of about 3 to 1, and preferably performing the electrolysis at a temperature of about 190±5° C. and at a current density in a range of from 1.5 to 4.0 A/dm².

A sliding member having a sulfide-based solid lubricating layer on the sliding plane thereof generally exhibits an excellent seizure resistance; however, to improve the life of machines, it is pertinently required to further increase the seizure resistance.

SUMMARY OF THE INVENTION

Accordingly, an object of the present invention is to fulfill this requirement. The present invention provides a novel and a simple production method capable of realizing a sliding member which achieves the requirement above in a industrially advantageous manner.

DESCRIPTION OF THE PREFERRED EMBODIMENTS

Figure 1:
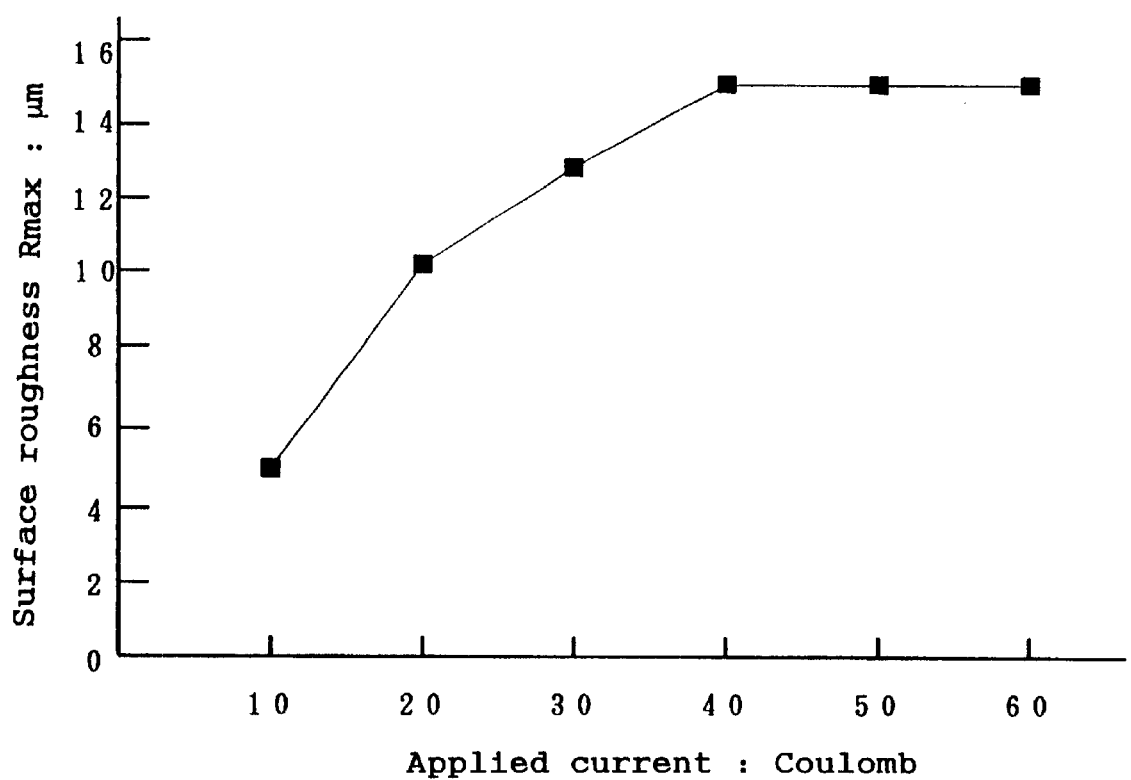
FIG. 1 is a graph which relates the degree of roughness (Rmax) at the interface between the generated iron sulfide layer and the steel component to the applied electrolytic current in case of performing anodic sulfurization in an aqueous solution according to the method of the present invention.

In accordance with the present invention, there is provided a sliding member having a sulfide-based solid lubricating layer on the sliding member of a metallic member, characterized in that the interface of the metallic member in contact with said solid lubricating layer is provided with a surface roughness Rmax of 1 µm or higher. In particular, the present invention provides a sliding member provided with an iron sulfide-based, a molybdenum sulfide-based, or a tungsten sulfide-based solid lubricating layer on the sliding surface thereof, characterized in that the interface of the steel member in contact with said solid lubricating layer is provided with a surface roughness Rmax of 1 µm or higher.

Further according to the present invention, there is proposed a method for producing a sliding member having excellent seizure resistance, comprising, in providing a sulfide-based solid lubricating layer on the sliding surface of a metallic member, forming the sulfide-based solid lubricating layer on the surface of the metallic member whose surface roughness Rmax is controlled to be 1 µm or higher. In particular, the present invention provides a method for producing a sliding member having excellent seizure resistance, comprising preparing an aqueous solution by dissolving one or two or more types of a thiocyanate or a thiosulfate of an alkali metal or an alkaline earth metal to obtain an electrolytic solution; dipping a steel member into the thus prepared electrolytic solution; and performing electrolytic treatment by using said steel member as the anode to form an iron sulfide based coating layer on the surface of said steel member by using the Fe component derived from the steel member and the S component of the solution. In the anodic sulfurization method using the aqueous solution as above, a sliding member having particularly superior seizure resistance can be achieved by controlling the surface morphology of the steel member on which the iron sulfide based coating layer is formed in such a manner to yield a surface roughness Rmax of 1 µm or higher, and more preferably, 2 µm or higher.

The present inventors found that, in a sliding member having a sulfide-based solid lubricating layer on the sliding surface of a metallic member, there is a clear correlation between the surface roughness Rmax of the interface of the metallic member in contact with the solid lubricating member before sliding and the seizure resistance, and that the seizure resistance is improved with increasing surface roughness Rmax of the interface. In practice, the surface roughness of the interface corresponds to the surface roughness of the surface of the metallic member from which the solid lubricant layer is removed. Accordingly, the surface roughness of the interface can be observed by measuring the surface roughness of the metallic member from which the solid lubricant layer is removed; still, it is also possible to obtain the surface roughness by measuring the height of the irregularities on the interface by performing microscopic observation on the cross section of the member having the solid lubricant layer thereon.

As is shown in the examples hereinafter, it was found that a distinguished improvement in seizure resistance can be obtained in case the surface roughness Rmax of the interface between the solid lubricant layer and the metallic member before subjecting to sliding is 1 μm or higher. The term "Rmax" as referred herein is the maximum height (Rmax) as defined in JIS B 0601, and the surface roughness referred in this specification is expressed by the Rmax defined therein.

In general, the sliding surface of a mechanical component is finished as smooth as possible. If irregularities are present on the sliding surface, shortage of lubricant oil generates on the protruded portions, and this leads to the acceleration of wear at those protruded portions. Similarly, the surface of the sliding members having solid lubricating layers has been finished as smooth as possible to form a solid lubricating layer on the surface. Accordingly, so long as it does not concern with special exceptions, it was customary to provide an interface as smooth as possible and having a Rmax of 1 μm or lower between the metallic member mother material and the solid lubricant layer.

However, according to the experience of the present inventors, it has been found that the seizure resistance can be greatly improved in case the mother material of the metallic member and the sulfide-based solid lubricating layer are brought into contact with each other by incorporating an interface having irregularities, more specifically, with an interface having such irregularities with a Rmax of 2 μm or higher. The reason for this is not completely clarified; however, it is presumed that, even in case the sulfide-based solid lubricating layer is gradually consumed to finally expose the protruded portion of the mother material, there occurs a phenomenon as such that the sulfide-based solid lubricating layer that is reserved in the surrounding concave portions is supplied to the protruded portion as to reduce the wear of the protruded portion. On the contrary, if the irregularities provided to the interface are small in number, the layer of the sulfide-based solid lubricating layer would be uniformly consumed as to lose a concave portion which functions as a reservoir. At the same time, furthermore, in this case, the area of the exposed metallic portion of the mother portion changes from spots to a planar area as to increase the contact area between the metals. Presumably, these reasons synergistically increase the change in causing seizure.

The sliding member to which the present invention is applied is represented by various types mechanical components having a sliding plane (inclusive of matching planes), such as various types of gears, shafts, hubs, as well as mechanical components such as pistons, cylinders, etc. As the representative sulfide-based solid lubricating layer to be formed on the surface of these metallic members, there can be mentioned those based on iron sulfide, molybdenum sulfide, or tungsten sulfide. Although the sulfide-based solid lubricating layers above are all applicable to the sliding member according to the present invention, the explanation below is made by taking an iron sulfide-based solid lubricating layer as an example.

The technology of improving the wear resistance of an iron or an iron-based alloy (which are collectively referred to hereinafter as "steel"; the term "steel" hereinafter includes iron and iron based alloys) member by forming an iron sulfide-based solid lubricating layer on the surface thereof is prevailing in the art. As a technique of forming a layer, anodic sulfurization in fused salt bath as proposed in the patent publications referred above is well known. However, in carrying out the sulfurization method above, it is necessary to use an eutectic mixed salt of potassium thiocyanate and sodium thiocyanate in order to lower the melting point of the fused salt. This not only makes it difficult to apply the low-cost single salts or other treatment agents, but also requires a practical bath maintained at a temperature in the vicinity of 190° C. However, such a requirement not only leads to dangerous operations, but also causes problems of lowering the mechanical strength or surface hardness of the mechanical components, because such mechanical components that are subjected to the process are mainly quenched articles that suffer the problems above when treated at a bath temperature in the vicinity of 190° C.

Accordingly, the present inventors attempted to develop an anodic sulfurization process using an aqueous solution in the place of the problematic fused salts. To accomplish this attempt, the present inventors extensively carried out tests and researches to obtain sliding members having excellent resistance against seizure by forming an iron sulfide-based solid lubricating layer on the surface of the steel while employing anodic sulfurization in aqueous solution. As a result, the present inventors realized the process, which is explained in detail below.

Conventionally employed sulfurization using fused salts is based on the knowledge that a favorable iron sulfide layer cannot be obtained by an electrolysis in an aqueous solution of a thiocyanate, and this knowledge led to the use of an eutectic salt of potassium thiocyanate and sodium thiocyanate. However, on attempting electrolysis in an aqueous solution of thiocyanates or thiosulfates, the present inventors found that, opposing to the common knowledge, and by properly selecting the conditions, it is possible to form iron sulfide on the surface of steel similar to the case of performing electrolysis in fused salt.

First, similar to the known processes, the surface of the steel component to be electrolyzed is cleaned by degreasing, pickling, rinsing, etc., and then, the surface roughness is controlled to yield a pertinent roughness of, for example, a Rmax of 1 μm or higher, and preferably, 2 μm or higher. The steel component is preferably subjected to carburization and quenched.

As the electrolytic solution, an aqueous solution containing $SCN^-$ ions or $S_2O_3^{2-}$ ions at a concentration of at least 0.01 mol/liter or higher is used. As an agent to supply the $SCN^-$ ions, there can be used a thiocyanate of an alkali metal or an alkaline earth metal, and as an agent to supply $SCN^-$ ions, there can be used a thiosulfate of an alkali metal or an alkaline earth metal. These salts may be used either singly or as a mixture of two or more types selected therefrom. In order to maintain the solution at a sufficiently high concentration, these salts may be incorporated into water at a quantity exceeding the solubility limit to keep the undissolved salts in the solution. It is also preferred to incorporate $FeSO_4$ and the like at a proper amount to maintain the bath constant.

The electrolysis is preferably carried out under the atmospheric pressure and at a temperature not lower than the solidification point but at a temperature not higher than the boiling point of the electrolytic solution, while applying the current set at a density in a range of from 1 to 15 $A/dm^2$.

In this manner, an iron sulfide layer having a composition represented by a general formula of $Fe_{1-x}S$ (where x is in a range of from 0 to 1 inclusive of 0) is formed on the surface of the steel component. The iron sulfide layer not necessary have a stoichiometric composition, but a thin coating (e.g., about 4 to 6 μm in thickness) formed on the surface of the steel component can improve the wear resistance and the seizure resistance of the surface.

A representative electrolysis can be carried out under conditions as follows.

Article: Carburized and heat treated case hardened steel

Bath composition: An aqueous solution containing 2 mol/liter of SCN⁻

Bath temperature: 20° C.

Current density: 3.2 A/dm$^2$

Duration of electrolysis: 10 minutes

Distance between the electrodes: 10 mm

In case of forming an iron sulfide layer on the surface of a steel component by performing anodic electrolysis in an aqueous solution under the conditions above, the degree of irregularities formed at the interface between the steel component and the iron sulfide layer greatly influences the seizure resistance of the steel component. Accordingly, the irregularities of the interface is preferably provided at a Rmax of 1 μm or higher, and more preferably, at a Rmax of 2 μm or higher. Further preferably, it is provided at a Rmax of 5 μm or higher. However, an excessively high degree of irregularities is not necessary, and is provided at a Rmax of 40 μm or lower, and preferably, 30 μm or lower.

On performing the anodic electrolysis in an aqueous solution as above to form such an interface having irregularities between the sulfide based layer and the steel member, the surface roughness of the steel component to be subjected to the electrolysis is preferably controlled to yield a Rmax of 1 μm or higher, and more preferably, at a Rmax of 2 μm or higher. To control the surface roughness of the steel component, there can be applied a mechanical method, a chemical etching method, an electrochemical method, etc., and there can be applied, as a special method, an electrolytic etching method taking advantage of a particular phenomenon which occurs by anodic electrolysis using the aqueous solution according to the present invention.

In the case of applying a mechanical method, the surface of the steel component is uniformly ground by employing a grinding machine using an abrasive having a predetermined granularity to control the surface roughness at a targeted Rmax value. In case of using a chemical etching method, an etching solution may be sprayed to the surface of the steel member to form pits, or an etching process using a masking material may be employed to form an irregular pattern. The latter masking treatment can be employed in an electrochemical etching process.

The electrolytic etching method comprises forming an iron sulfide layer in the aqueous solution above by means of anodic electrolysis, while controlling the behavior of Fe which elutes out from the steel component used as the anode to control the degree of irregularities formed in the interface between the steel member and the sulfide based layer. In employing this method, the present inventors have found that, by properly roughening the surface of the steel component on which the iron sulfide layer is formed, a favorable correlation can be obtained between the number of sites from which Fe is eluted out from the steel component and the quantity of applied current. More specifically, in case of forming a layer of iron sulfide on the steel component by performing anodization in the aqueous solution, it was found that a higher value for Rmax can be obtained with increasing quantity of applied current. The correlation between the applied current and the value of Rmax is believed to be influenced by the surface state of the steel component that is present on initiating the application of current. Accordingly, it is preferred to control the surface state at a properly roughened state, and, in practice, it is convenient to employ a process comprising first forming a layer of iron sulfide, followed by forming cracks on the layer and generating pits at the crack portions using an alkaline solution.

Thus, in accordance with the present invention, an aqueous solution containing dissolved therein one type or two types or more of thiocyanates or thiosulfates of alkali metals or alkaline earth metals is prepared to use it as the electrolytic solution, and a steel member is immersed in the electrolytic solution to carry out the electrolysis using the steel member as the anode. In this manner, an iron sulfide based layer is formed on the surface of the steel member by using the Fe component from the steel and the S component from the solution as the reacting agents, followed by forming multiple cracks in the resulting layer. The steel component having the layer on which cracks are generated thereon is then electrolytically etched in an alkaline aqueous solution by using it as the anode, and the steel component is further subjected to electrolytic treatment in an aqueous solution containing dissolved therein one type or two types or more of thiocyanates or thiosulfates of alkali metals or alkaline earth metals by using it as the anode. In this manner, an iron sulfide based layer is formed on the surface of the steel component while forming an interface having irregularities at a Rmax value or 1 μm or higher between the steel member and the layer. Thus, the present invention provides a method of producing a sliding member having excellent seizure resistance in this manner. The degree of Rmax of the interface can be controlled by adjusting the applied current.

The present invention is described in further detail below by referring to non-limiting examples below.

EXAMPLE 1

A SCM415 case hardening steel was machined to obtain necessary number of Fabily test pins (pins to be subjected to seizure test) each having an outer diameter of 6.5 mm and a length of 4 mm. Each of the pins was subjected to carburization treatment at 930° C. for a duration of 5 hours, and was then subjected to oil quenching from 830° C. and tempering at 180° C. The carburized and tempered pins thus obtained were used as the test specimens to be subjected to the treatments below.

One end of a pin was fixed to a chuck of a rotary polishing machine, and while inserting the body of the pins between Emery papers, the pin was moved along the axial direction while rotating and reversely rotating it around the axis. In this manner, a cross-hatched rough surface was uniformly formed on the outer peripheral plane of the pin body. In forming the roughened peripheral plane of the pin body, it was devised as such that the ground peripheral plane should have an area greater than that of the peripheral plane of the pin body to be brought into contact in sliding it against the V block when set on a Fabily test machine. The surface roughness was controlled by changing the types of Emery paper, such that a surface having Rmax value of 2.5 μm, 8.2 μm, or 10.1 μm, can be obtained on the pins.

After degreasing, pickling, and rinsing, the pins were subjected to electrolytic sulfurization using them as the anodes. More specifically, a mixture of 7.5 parts by weight of NaSCN and 22.5 parts by weight of KSCN was dissolved into 100 parts by weight of water to obtain an aqueous solution, and 10 parts by weight of FeSO$_4$ was added therein as a bath controller to prepare an aqueous solution. A 500-ml portion of the aqueous solution thus obtained was placed in a 1-liter glass container, and the bath temperature thereof was maintained at the room temperature.

One of the pins was vertically immersed to use it as the anode at the central portion of the container having therein the aqueous solution, and two SUS304 cathode plates were each immersed at the same distance of 10 mm from the pin in such a manner that the pin may be inserted between the cathode plates. Then, the three pins differing in surface roughness prepared above were each subjected to electrolytic treatment by using the pin as the positive electrode and the cathode plate as the negative electrode under the same conditions by applying current at a density of 3.2 A/dm² for a duration of 10 minutes. As a result, iron sulfide layers each having a thickness of 4 to 6 μm were formed on the surface of the pins.

One end of each of the thus obtained pins was set in a chuck of a Fabily test machine manufactured by H.E.F Co., Ltd. (Hydro Mechanic Wear Laboratory), and while clamping the body of the pins with two blocks each having a V-shaped contact plane, the pins were each rotated around the axis at a rate of 300 rpm while applying a load along the pin direction. Thus, the load at initiating seizure (denoted as "maximum seizure resistance load") was measured. As a result, the following maximum seizure loads were obtained in accordance with the surface roughness of the pins.

| Surface roughness Rmax (μm) of pin | Maximum seizure resistance load (Kgf) |
| --- | --- |
| 2.5 | 880 |
| 8.2 | 1020 |
| 10.1 | 1030 |

As a comparative example, a pin was prepared in the same manner as above except for not applying grinding in a rotary polishing machine. A maximum seizure resistance load of 780 Kgf was obtained for this specimen. The surface roughness of the specimen in this comparative example (i.e., an as-carburized and quenched pin without applying grinding) was found to be about 0.6 μm.

EXAMPLE 2

The same as-carburized and quenched pins as those used in Example 1 were used as the specimens. More specifically, unlike the case in Example 1, precision machined, as-carburized and quenched pins having a surface roughness Rmax of 1 μm or lower, and not subjected to surface grinding using a polishing machine was degreased, pickled, and rinsed, followed by electrolytic treatment below by using them as anodes. The electrolysis described below were all performed under an ordinary temperature of 25° C.

First, an aqueous solution containing 1 mol/liter of sodium thiosulfate was placed inside the same container as that used in Example 1, and one of the pins was vertically immersed into the aqueous solution at the central portion. Then, two SUS304 cathode plates were each immersed at the same distance of 10 mm from the pin in such a manner that the pin may be inserted between the cathode plates. Then, the pin was subjected to electrolytic treatment by using the pin as the positive electrode and the cathode plates as the negative electrodes by applying current at a density of 3.2 A/dm² for 40 C (Coulombs). As a result, iron sulfide layer was formed on the surface of the pin (the treatment is referred to hereinafter as "a precoating treatment").

Then, after taking out the pin from the electrolytic solution and exposing it to air for 30 seconds, it was immersed in another electrolytic solution (an aqueous solution of sodium hydroxide at a pH value of 9). During the exposure to air, uniform cracks were found to form on the layer generated by the precoating treatment. The pin having formed thereon the layer in which the cracks were generated was subjected to electrolysis in an aqueous sodium hydroxide solution of pH 9 by applying a current at a density of 0.8 A/dm² for 40 C (Coulomb) between the pin used as the anode and the cathode plates similar to above. By performing the electrolysis above, it was found that exposed metallic surface portions generate while eluting out a part of the coating, and that irregularities form on the surface of the pin (metallic plane and the layer plane). This treatment is referred to hereinafter as an "alkali coating treatment".

After the alkali coating treatment above, the pin was rinsed and allowed to stand under air for a duration of 30 seconds, followed by a subsequent electrolytic sulfurizatin treatment. More specifically, electrolytic sulfurization treatment is performed in the same electrolytic solution and under the same current density as those used in the precoating treatment above while using the pin subjected to alkali coating treatment as the anode. During this treatment, there occurs a phenomenon as such that the surface roughness of the interface between the pin and the iron sulfide layer changes depending on the applied current. More specifically, a plurality of pins subjected to a treatment performed under the same conditions as above were prepared except for the final electrolytic sulfurization above (that is, pins were prepared by the same alkali coating treatment), and the same pins were covered with iron sulfide layers while differing the applied current during the electrolytic sulfurization. The electrolysis was performed under the conditions of using a 1-mol/liter sodium thiocyanate bath while applying current at a density of 3.2 A/dm². Each of the pins thus obtained was stripped off of the iron sulfide layer to measure the roughness of the interface between the layer and the pin (i.e., the surface roughness of the pin surface). FIG. 1 shows the plots obtained for the thus observed surface roughness Rmax of the pin at the interface in relation with the current applied at the electrolytic sulfurization treatment.

Referring to FIG. 1, there can be read a clear correlation between the quantity of applied current and the surface roughness Rmax of the mother material under the layer. It can be understood therefrom that the Rmax increases with increasing quantity of applied current. The reason for this is believed that, if irregularities are properly provided to the surface of the pins or to the coating planes by applying alkali coating treatment, there is a behavior as such that the sites from which Fe elute out from the mother material segregate upon electrolytic sulfurization, and thereby deep sites, at which layers of iron oxide deposit, tend to form more easily.

Figure 2:
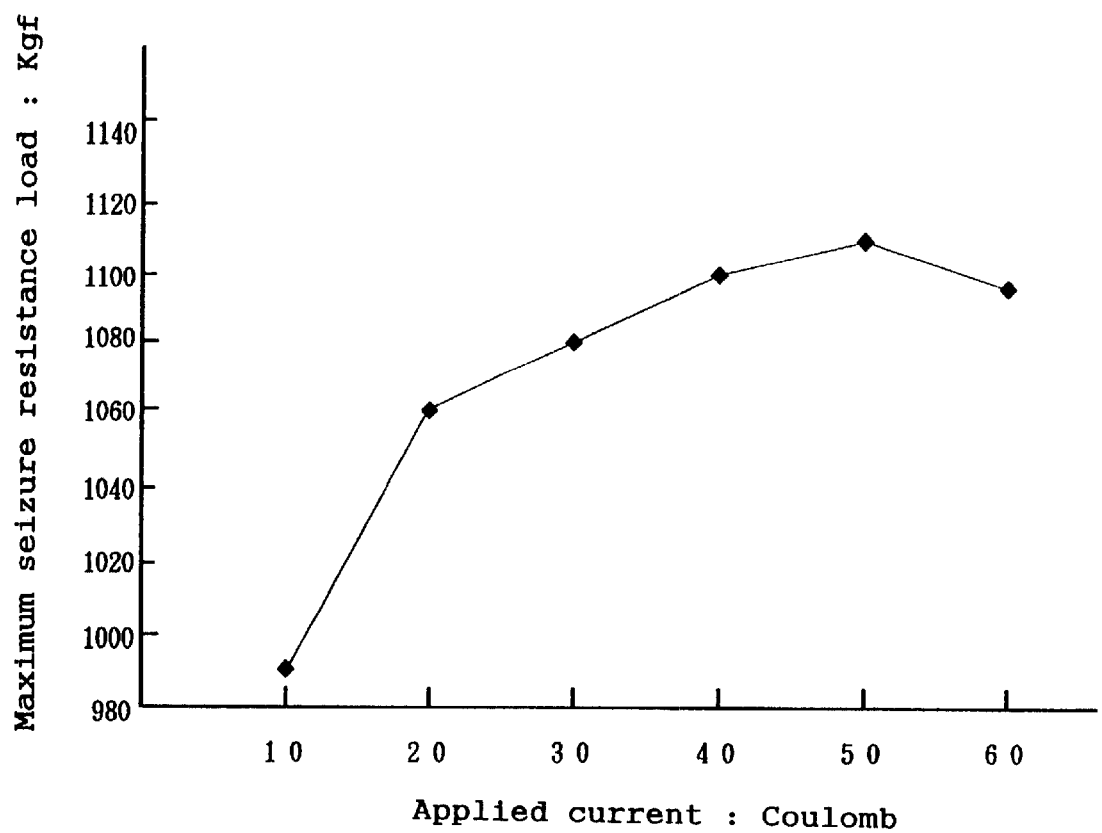
FIG. 2 is a graph which relates the maximum seizure load for the treated article to the applied electrolytic current for a case of performing the treatment under the same conditions as those of FIG. 1.

In FIG. 2 are plotted the maximum seizure resistant load in relation with the quantity of applied current for a plurality of pins subjected to the treatment following the same conditions as above up to the electrolytic sulfurization treatment except for the electrolytic sulfurization performed under differing amount of applied current, and to the Fabilly test performed in a manner similar to that described in Example 1. From the results shown in FIG. 2, it can be understood that a clear correlation is found between the applied current and the maximum seizure resistant load, and that the resistance load increases with increasing applied current. This fact in combination with the results of FIG. 1 shows that the maximum seizure resistance load is improved with increasing roughness (i.e., the surface roughness of the mother material Rmax) of the interface between the mother material and the layer.

EXAMPLE 3

The precision machined, as-carburized and quenched pins same as those employed in Example 1 (i.e., the pins having a surface roughness Rmax of 1 μm or lower up to a process of carburization quenching) were subjected to degreasing, pickling, rinsing, and drying. Then, a polyethylene film perforated with numerous holes each 4 mm in diameter was wound around the body of the pins in such a manner that numerous exposing holes might be formed at an interval of about 0.1 mm on the body, such that the surface of the mother material may be exposed there through. The pins were then subjected to the electrolytic sulfurization treatment below.

One of the pins was vertically immersed as an anode at the central portion of the same container as that used in Example 1 having provided therein a 20 wt. % aqueous solution of sodium thiosulfate, and two SUS304 cathode plates were each immersed at the same distance of 10 mm from the pin in such a manner that the pin may be inserted between the cathode plates. Then, the pins were each subjected to electrolytic treatment by using the pin as the positive electrode and the cathode plates as the negative electrodes under the same conditions while applying current at a density of 3.2 $A/dm^2$ and for 60 C. After the treatment, the pins were rinsed, and subsequent to the removal of the film, they were immersed again in the electrolytic solution to apply current at a density of 1.6 $A/dm^2$ for 18 C by using the pin as the positive electrode. Accordingly, an iron sulfide layer having irregularities was formed by the first electrolytic sulfurization in such a manner that the masking portion have irregularities which avoid the formation of a layer, and a layer of iron sulfide formed on the portions free of films by the subsequent electrolytic sulfurization treatment.

The pins having thereon the iron sulfide layer thus obtained were subjected to Fabilly test in the same manner as in Example 1, and a maximum seizure resistance load of 1,080 Kgf was obtained. On measuring the surface roughness Rmax of the mother material of the pin on another pin from which the iron sulfide layer was stripped off, it was found to yield a value of 13.2 μm.

EXAMPLE 4

The same procedure as that performed in Example 3 was followed, except for applying current at a density of 16 $A/dm^2$ and for 18 C after removing the film. The thus obtained pin having the iron sulfide thereon was subjected to Fabilly test in the same manner as in Example 1 to obtain a maximum seizure resistance of 1,060 Kgf. Similarly, on measuring the surface roughness Rmax of the mother material of the pin on another pin from which the iron sulfide layer was stripped off, it was found to yield a value of 10.7 μm.

EXAMPLE 5

Two as-carburized and quenched pins same as those described in Example 1 (having a surface roughness Rmax of 1 μm or lower at the carburized and quenched state) were degreased, pickled, rinsed, and dried, which were then subjected to electrolytic treatment using the pins as the anode and to the treatment of forming a layer of molybdenum disulfide.

One of the pins thus obtained was vertically immersed as an anode at the central portion of the same container as that used in Example 1 having provided therein a 10 wt. % aqueous solution of sodium thiocyanate, and two SUS304 cathode plates were each immersed at the same distance of 10 mm from the pin in such a manner that the pin may be inserted between the cathode plates. Then, the pins were each subjected to electrolytic treatment by using the pin as the positive electrode and the cathode plates as the negative electrodes while applying current at a density of 3.2 $A/dm^2$ and for 40 C (Coulomb). Thus was obtained an iron sulfide based layer by the treatment.

Then, after taking out the pin from the electrolytic solution and exposing it to air for 30 seconds, it was immersed in another electrolytic solution (an aqueous solution of sodium hydroxide at a pH value of 9). During the exposure to air, uniform cracks were found to form on the layer generated by the precoating treatment. The pin having formed thereon the layer in which the cracks were generated was subjected to electrolysis in an aqueous sodium hydroxide solution of pH 9 by applying a current at a density of 0.8 $A/dm^2$ for 40 C (Coulomb) between the pin used as the anode and the cathode plates similar to above. Similar to the case of Example 2, electrolytic corrosion occurs to the crack portions to elute out the metal. Thus, it was found that exposed metallic surface portions generate, and at the same time, a part of the layer elute out as to generate irregularities on the surface of the pin (metallic plane and the layer plane).

After the alkali coating treatment above, the pin was rinsed and allowed to stand under air for a duration of 30 seconds, followed by a subsequent electrolytic sulfurizatin treatment. More specifically, electrolytic sulfurization treatment was performed in a 20% aqueous solution of sodium thiosulfate as the electrolytic solution while applying current at a density of 3.2 $A/dm^2$ by using the pins as anodes. The two pins were treated under the same conditions up to this step, but in the electrolytic sulfurization, they were treated under different applied current conditions. More specifically, one pin was treated with applied current of 10 C, while the other was applied under a current of 30 C On removing the iron sulfide layer formed on each pins, the Rmax of the layer interface for one pin was found to be 10.2 μm and that for the other was found to be 14.8 μm.

Then, a paint obtained by mixing molybdenum disulfide with epoxy resin at a ratio by weight of 1:2 was sprayed to the two pins differed in surface roughness at a spray pressure of 2 $kg/cm^2$ to coat the pin surfaces with a film 5 μm in thickness. The pins thus coated with films were both calcined at 180° C. for a duration of 30 minutes as to obtain pins having thereon a solid lubricating layer of molybdenum disulfide. The pins were subjected to Fabilly test in the same manner as in Example 1, and the pin having a surface roughness Rmax of 10.2 μm was found to yield a maximum seizure resistance load of 1,550 Kgf, while the other pin having the Rmax of 14.8 μm was found to yield 1,650 Kgf.

EXAMPLE 6

The same procedure as that of Example 1 was performed, except for using, as the electrolytic solution, an aqueous solution obtained by dissolving 30 parts by weight of KSCN in 100 parts by weight of water and adding therein 10 parts by weight of $FeSO_4$ as the bath controller. However, the surface the pin was ground to yield a roughness Rmax of 10.4 μm by using the same rotary polishing machine as that used in Example 1. As a result, an iron sulfide layer having a thickness of from 4 to 6 μm was formed on the surface of the pin, and the pin yielded a maximum seizure resistance load of 1,035 Kgf.

EXAMPLE 7

The same procedure as that of Example 1 was repeated, except for using, as the electrolytic solution, an aqueous solution obtained by dissolving 30 parts by weight of NaSCN in 100 parts by weight of water and adding therein 10 parts by weight of $FeSO_4$ as the bath controller. The surface of the pin was ground to a roughness Rmax of 5.2 μm by using the same rotary polishing machine as that used in Example 1. As a result, an iron sulfide layer having a thickness of from 4 to 6 μm was formed on the surface of the pin, and the pin yielded a maximum seizure resistance load of 974 Kgf.

EXAMPLE 8

The same procedure as that of Example 1 was repeated, except for using, as the electrolytic solution, an aqueous solution obtained by dissolving 50 parts by weight of NaSCN in 100 parts by weight of water and adding therein 10 parts by weight of $FeSO_4$ as the bath controller. The surface of the pin was ground to a roughness Rmax of 8.3 μm by using the same rotary polishing machine as that used in Example 1. As a result, an iron sulfide layer having a thickness of from 4 to 6 μm was formed on the surface of the pin, and the pin yielded a maximum seizure resistance load of 962 Kgf.

EXAMPLE 9

The same procedure as that of Example 1 was repeated, except for using, as the electrolytic solution, an aqueous solution obtained by dissolving 30 parts by weight of $Ca(SCN)_2$ in 100 parts by weight of water and adding therein 10 parts by weight of $FeSO_4$ as the bath controller. The surface of the pin was ground to a roughness Rmax of 2.6 μm by using the same rotary polishing machine as that used in Example 1. As a result, an iron sulfide layer having a thickness of from 4 to 6 μm was formed on the surface of the pin, and the pin yielded a maximum seizure resistance load of 818 Kgf.

EXAMPLE 10

The same procedure as that of Example 1 was repeated, except for using, as the electrolytic solution, an aqueous solution obtained by dissolving 30 parts by weight of $Ba(SCN)_2$ in 100 parts by weight of water and adding therein 10 parts by weight of $FeSO_4$ as the bath controller. The surface of the pin was ground to a roughness Rmax of 4.2 μm by using the same rotary polishing machine as that used in Example 1. As a result, an iron sulfide layer having a thickness of from 4 to 6 μm was formed on the surface of the pin, and the pin yielded a maximum seizure resistance load of 915 Kgf.

EXAMPLE 11

The same procedure as that of Example 1 was repeated, except for using, as the electrolytic solution, an aqueous solution obtained by dissolving 30 parts by weight of $Na_2S_2O_3$ in 100 parts by weight of water and adding therein 10 parts by weight of $FeSO_4$ as the bath controller. The surface of the pin was ground to a roughness Rmax of 3.4 μm by using the same rotary polishing machine as that used in Example 1. As a result, an iron sulfide layer having a thickness of from 4 to 6 μm was formed on the surface of the pin, and the pin yielded a maximum seizure resistance load of 846 Kgf.

As described above, the present invention provides sliding components having a sulfide based solid lubricating layer improved in seizure resistance. In accordance with the present invention, electrolytic sulfurization treatment in an aqueous solution is performed without employing fused salt electrolysis. Thus, sliding components having excellent seizure resistance can be produced at a low cost and with improved operability. Accordingly, the present invention can greatly contribute to the improvement of machine life.

While the invention has been described in detail by making reference to specific examples, it should be understood that various changes and modifications can be made without departing from the scope and the spirit of the present invention.

What is claimed is:

1. A method for producing a sliding member having excellent seizure resistance comprising the steps of:

preparing an aqueous solution by dissolving one or two or more types of a thiocyanate or a thiosulfate of an alkali metal or an alkaline earth metal to obtain an electrolytic solution;

dipping a steel member into the electrolytic solution; and performing electrolytic treatment by using said steel member as the anode to form an iron sulfide based coating layer on the surface of said steel member, wherein said iron sulfide based coating layer comprises an iron component and an S component, the Fe component derived from the steel member and the S component derived from the thiocyanate or thiosulfate in the electrolytic solution.

2. A method for producing a sliding member having excellent seizure resistance as claimed in claim 1, wherein, the surface of the steel member on which the iron sulfide based coating layer is formed is controlled to yield a surface roughness Rmax of 1 μm or higher.

3. A method for producing a sliding member having excellent seizure resistance as claimed in claim 2, wherein, the surface roughness is controlled by performing mechanical grinding, chemical etching, or by electrochemical etching treatment.

4. A method for producing a sliding member having excellent seizure resistance comprising the steps of:

preparing an aqueous solution by dissolving one or two or more types of a thiocyanate or a thiosulfate of an alkali metal or an alkaline earth metal to obtain an electrolytic solution;

dipping a steel member into the electrolytic solution;

performing electrolytic treatment by using said steel member as the anode to form an iron sulfide based coating layer on the surface of said steel member, wherein said iron sulfide based coating layer comprises an iron component and an S component, the Fe component derived from the steel member and the S component derived from the thiocyanate or thiosulfate in the electrolytic solution;

generating multiple cracks on said coating layer;

performing electrolysis in an aqueous alkaline solution by using the steel member having generated thereon the cracks as the anode; and performing electrolytic treatment in an aqueous solution dissolved therein one or two or more types of a thiocyanate or a thiosulfate of an alkali metal or an alkaline earth metal by using the steel member subjected to the electrolysis, thereby forming an iron sulfide based coating layer on the surface of said steel member while simultaneously forming irregularities having an Rmax of 1 μm or higher on the interfacial surface of the steel member in contact with the coating layer.

5. A method for producing a sliding member having excellent seizure resistance as claimed in claim 4, wherein the Rmax of the interface is adjusted by quantitatively controlling the applied current.

6. A method for producing a sliding member having excellent seizure resistance as claimed in claim 4, wherein the electrolytic solution for forming the iron sulfide based coating layer contains $SCN^-$ or $S_2O_3^{2-}$ at a concentration of 0.01 mol/liter, and the electrolytic treatment is performed by applying the current at a current density of from 1 to 15 $A/dm^2$ under atmospheric pressure and at a temperature not lower than the solidification point but not higher than the boiling point of the electrolytic solution.

* * * * *